INVENTOR.
VICTOR W. BOLIE
BY Robert G. Rogers
ATTORNEY

June 17, 1969  V. W. BOLIE  3,449,767
ARTIFICIAL HEART REGULATING SYSTEM
Filed Sept. 24, 1965  Sheet 3 of 4

ANGULAR POSITION OF CRANKSHAFT 27

POSITION OF VALVE 32

POSITION OF VALVE 34

ARTIFICIAL HEART CHAMBER PRESSURE

VALVE 62 POSITION

VALVE 68 POSITION

VALVE 76 POSITION

VALVE 84 POSITION

*INVENTOR.*
VICTOR W. BOLIE
BY *Robert G. Rogers*
ATTORNEY

United States Patent Office 3,449,767
Patented June 17, 1969

3,449,767
ARTIFICIAL HEART REGULATING SYSTEM
Victor W. Bolie, Tustin, Calif., assignor to North American Rockwell Corporation, a corporation of Delaware
Filed Sept. 24, 1965, Ser. No. 489,983
Int. Cl. A61f *1/24, 1/00*
U.S. Cl. 3—1      14 Claims

ABSTRACT OF THE DISCLOSURE

A system for energizing an artificial heart. A piston provides air pressure to operate a prosthetic during portions of the systolic and diastolic intervals. A pair of valves vent the prosthetic to atmospheric pressure at appropriate times during the heart cycle, under control of a pair of gear differentials driven in synchronism with the piston. The operating cycle may be controlled by appropriately changing the settings of the differentials.

---

This invention relates to an artificial heart system and more specifically to a power system for energizing and controlling an artificial heart.

The use of an artificial heart connected into the human circulating system to maintain the proper blood flow during periods of medical deficiency of the normal human heart, requires a simple and reliable energizing system. Such a system must control and energize the artificial heart to effectively maintain the blood circulation under proper pressure and timing. Such a system must be portable and rugged to facilitate use in hospital rooms, and have means for adjusting the timing so that the blood pumping rate of the artificial heart can be changed to meet varying physiological requirements. The artificial heart under the stimulus of the pumping system must perform substantially as a natural human heart.

Further, the valving arrangement of a pneumatic energizing system for an artificial heart must be controlled so that the air chambers of the artificial heart are assured a proper pressure reference level by automatically connecting them with the atmosphere at some time during the diastolic portion of each cardiac cycle.

Briefly, the invention comprises an artificial heart energizing system utilizing in one embodiment a motor driven piston and pneumatic valve gating arrangement which operates over a wide range of arterial blood pressures and provides a variable pulse rate and variable stroke volume in accord with physiological needs. An included safety feature insures that the fluid chamber of the surgically installed prosthesis is momentarily exposed to a reference pressure such as the ambient atmospheric pressure during every diastole.

In the pneumatic gating arrangement, the switching intervals of the valves and the fluid source are appropriately synchronized. Two embodiments are described herein for controlling valve action although other systems may also be utilized.

The energizing system of the present invention is described with relation to the pumping of one heart chamber. However, it is within the purview of the invention to provide duplicate systems for driving two heart chambers in a synchronized and controlled manner, with means provided for maintaining balance of the outputs of the two chambers.

Therefore, it is a primary object of this invention to provide a cyclic energizing system for an artificial heart.

It is another object of this invention to provide an artificial heart pump which is portable and rugged in construction and which is simple and reliable to use.

It is still another object of this invention to provide an artificial heart pump which energizes the artificial heart in a controlled manner.

It is a further object of this invention to provide a regulating system for an artificial heart pump which may be adjusted to change the heart beat rate and stroke volume in accord with different physiological requirements.

Still a further object of this invention is to provide a pumping system for energizing an artificial heart in a physiological satisfactory manner over the full range of arterial blood pressures found in experimental animals as well as in man.

It is still a further object of this invention to provide a pump system for controlling the quantity of a fluid into an enclosed area and for establishing a pressure reference inside the area.

These and other objects of the invention will become apparent in connection with the description taken in light of the drawings in which.

Figure 4A:
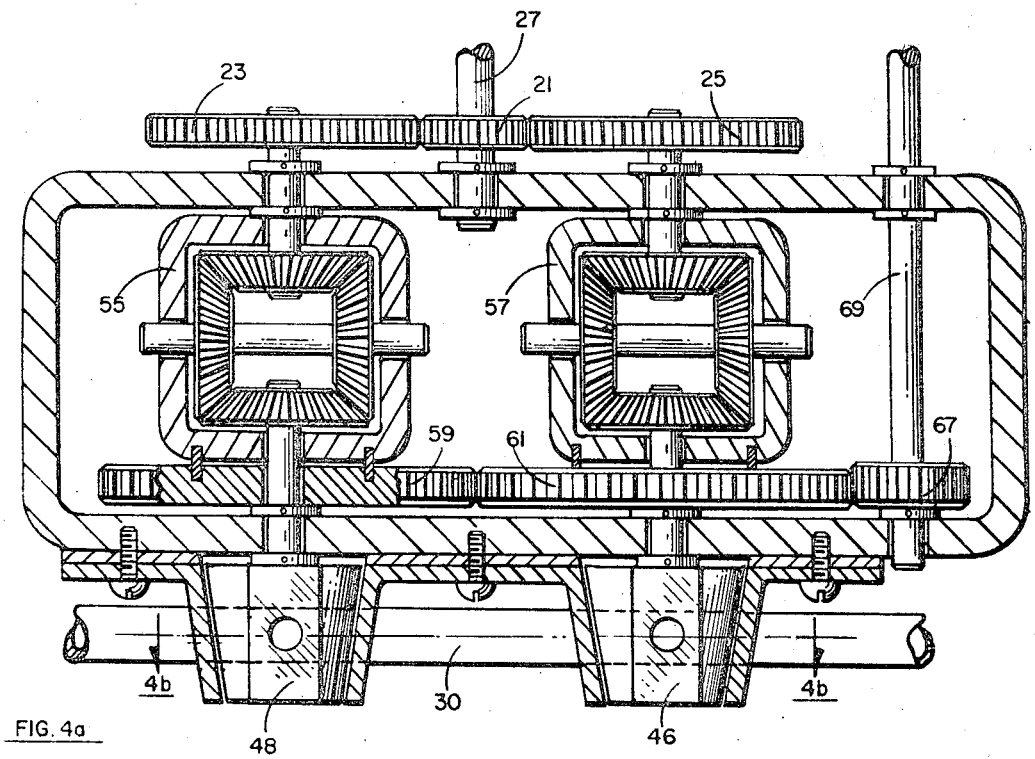
Figure 4B:
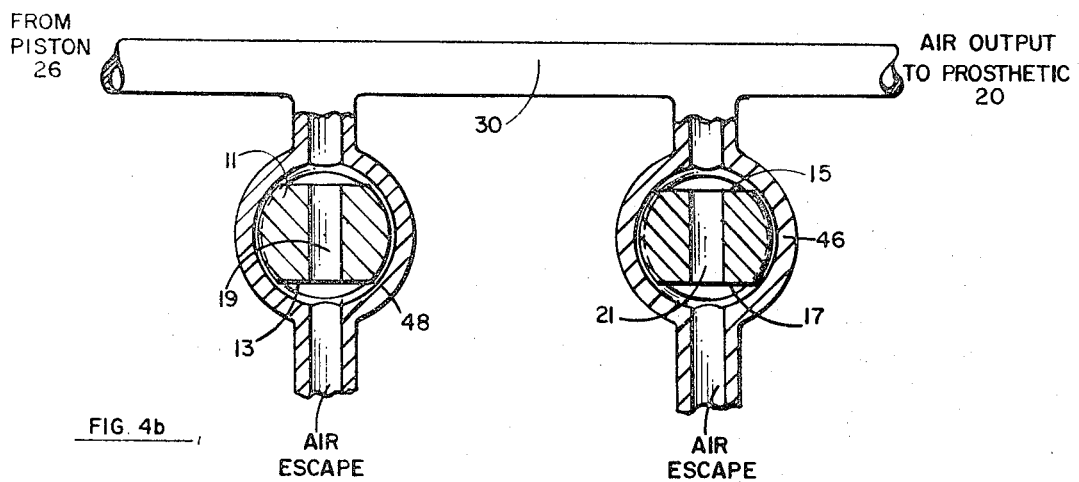

FIGURE 3 graphically illustrates the relationship between piston travel and the first embodiment air valve control system operation;

FIGURE 4a is a schematic diagram of the second embodiment control system for controlling air flow to the heart chamber; and FIGURE 4b is a cross sectional view of the valve of FIGURE 4a.

Figure 1:
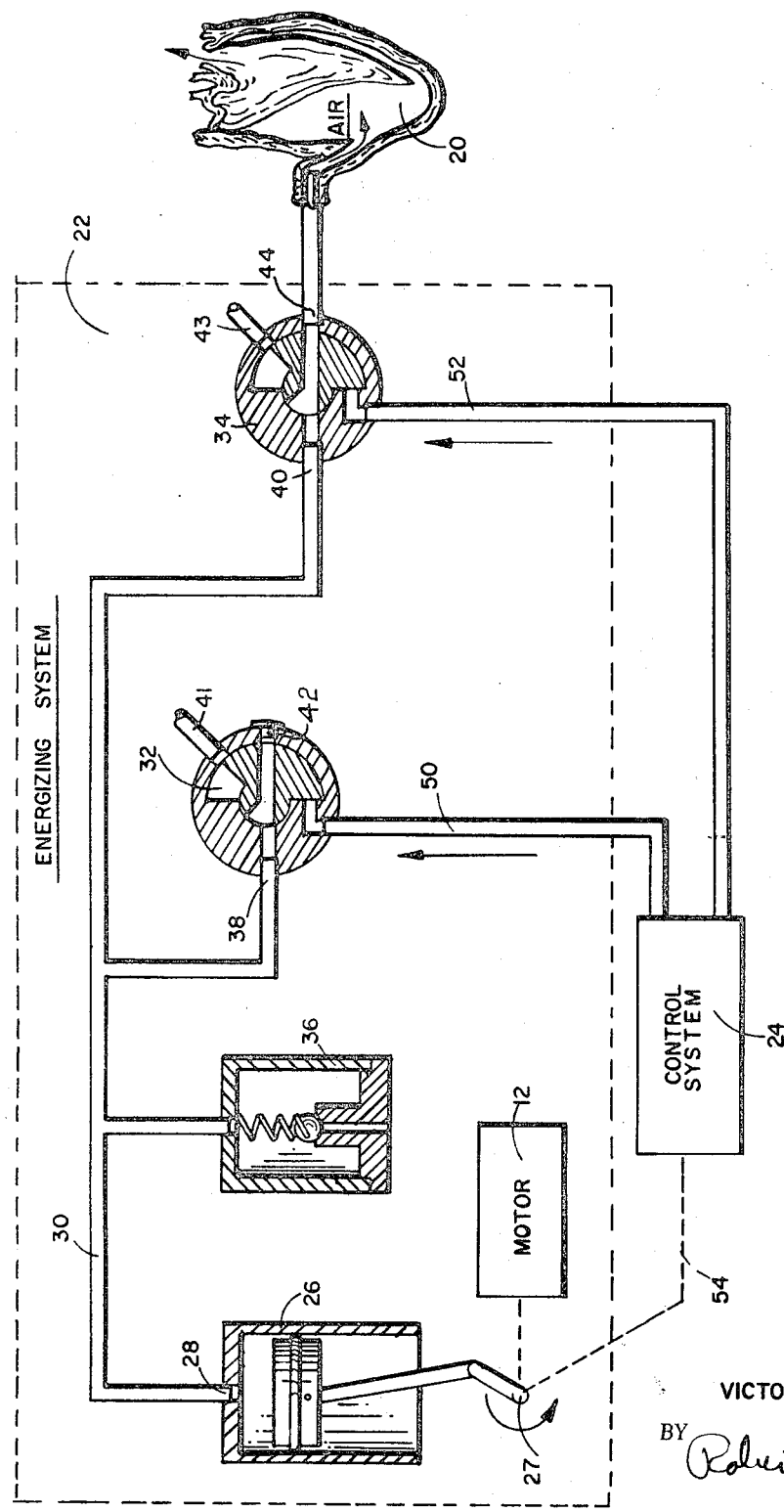
FIGURE 1 is a schematic representation of one embodiment of a regulating system of the present invention showing the energizing system.

Referring now to FIGURE 1, the regulating system of the present invention is illustrated as including as major components an artificial heart pump ventricle or chamber 20, an energizing system 22 for supplying pumping energy or fluid to chamber 20, and a first embodiment control system 24 for programming the operation of the energizing system in a predetermined manner. The artificial chamber 20 may be of any type well known in the art capable of responding to fluid pressure, such as, for example, the artificial hearts and chambers described in "Artificial Heart Research-Survey and Prospectus" as reported in Transactions New York Academy of Sciences, Volume 27, #3, pages 309–312, January 1965, Bert K. Kusserow; "Silastic Artificial Heart Constructed on Wax Molds," Stephen R. Topaz, Cleveland Clinic Quarterly, Vol. 31–I–1964, pgs. 49–52; "A Sac Type of Artificial Heart Inside the Chest of Dogs," Tetsuzo Akutsu, Velimir Mirkovitch, Stephen R. Topaz, William J. Kolff, The Journal of Thoracic and Cardiovascular Surgery, Vol. 47 #4, April 1964, pgs. 512–527; "Development of Artificial Intrathoracic Circulatory Pumps" by C. W. Hall, Domingo Liotta, W. S. Henly, E. S. Crawford and M. E DeBakey, American Journal of Surgery, Vol. 108, November 1964, pgs. 685–692.

One embodiment of energizing system 22 includes an air pump 26, preferably of the piston type, operating, for example, at cycle rates of from 60–180 cycles per minute, having its shaft 27 driven by a motor 12 which is well regulated and has an adjustable speed control. Other fluid pumping systems, particularly gas pumping systems may also be used.

For a piston type air pump, it is preferred that the volume of piston displacement be approximately twice as large as the maximum required stroke volume of the heart. For the larger piston displacement, the increase in air pressure to the heart or surge of air into the heart chamber is more rapid. The pressure variation inside the heart chamber is exemplified by FIGURE 3. In addition, a relatively large volume displacement of the piston permits greater variation in the air quantity to the heart. For example, the stroke volume of man may vary from 70 milliliters to 140 milliliters for a normal heartbeat range of 60–180 beats per minute.

A piston displacement volume which is appreciably larger than the maximum required ventricular stroke volume is also important when withdrawing air from the heart to prevent tamponade, that is, to insure the complete elimination of excess air in the chamber at the end of the diastolic pulse of the cycle.

The outlet 28 of pump 26 (see FIGURE 1) is connected to line 30 which feeds two valves 32 and 34, connected in parallel, and a suction release valve 36. Each of the valves 32 and 34 is of standard design and has inlets 38 and 40 and a pair of outlets 41, 42 and 43, 44 respectively. For example, the valves may be described as single pilot spring return valves available commercially as Modern Air No. 100 and also available from the Schrader Air Valve Co. and the Compressed Air Service Company. One example of the valves is described and illustrated in Patent No. 3,182,335 relating to a dual chamber artificial heart. The inlet 38 or 40 of each valve is connected to either one of its respective outlets, the relative position being governed by control system 24 as described in detail hereinafter. The outlet 41 of valve 32 is connected to the atmosphere, while outlet 42 is plugged. The normal connection between the inlet and outlets of valves 32 and 34 are shown as solid lines The outlet 43 of valve 34 is connected to the atmosphere, while outlet 44 is connected to the artificial heart ventricle 20.

The suction release valve 36, which may be of the standard spring tension type, connects the line 30 to the atmosphere whenever the vacuum created by the piston withdrawing air from the artificial heart is in excess of a predetermined amount. In this manner, damage to the artificial heart which might result because of excessive vacuum is eliminated.

Figure 2:
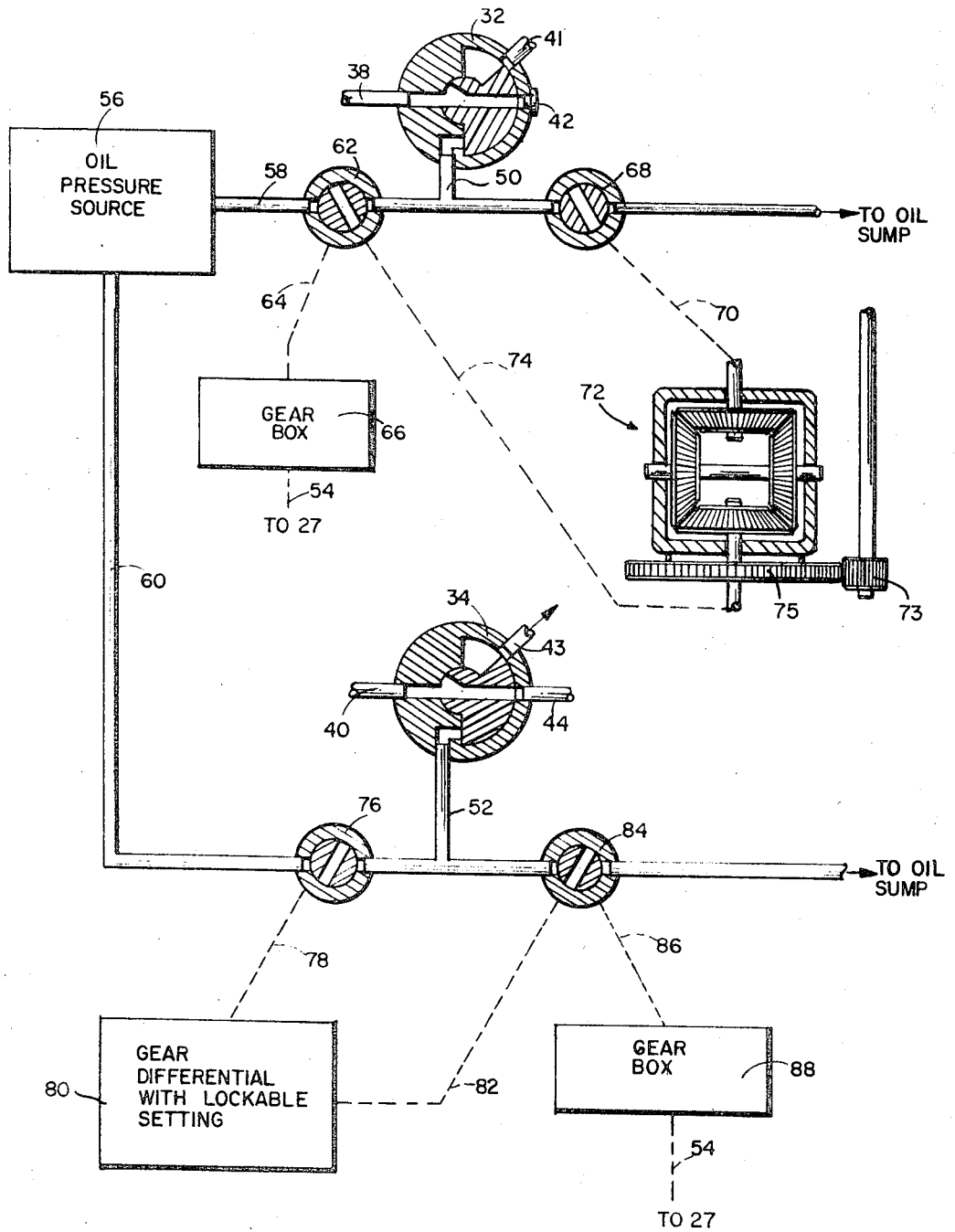
FIGURE 2 is a schematic diagram showing the first embodiment control valve system.

Control system 24 (see FIGURE 1) is connected by fluid lines 50 and 52 to air valves 32 and 34 and is mechanically connected through shaft 54 to the drive shaft 27 of the piston 26. The details of the control system 24 are shown schematically in FIGURE 2 and include a source of pressurized liquid 56, e.g., oil, which is connected to two branches 58 and 60. Referring still to FIGURE 2, note that branch 58 has an initiator valve 62 which is rotatable and driven through shaft 64 and gear box 66. The gear box 66 is designed so that valve 62 opens only once during a pumping cycle. The same statement is applicable to gear box 88 used in connection with valve 84. When valve 62 is open, i.e., properly aligned with line 58, the source of pressurized liquid 56 is connected to fluid line 50 and to terminator valve 68. The outlet of valve 68 is connected to a liquid sump. The rotatable valve 68 is driven by shaft 70 which is connected through a gear differential 72 and shaft 74 to valve 62. In this manner, valves 62 and 68 rotate in synchronism with the crankshaft 27 and, by means of gear differential 72, a selected angular difference is maintained between the open positions of valves 62 and 68. One example of differentials 72 and 80 is illustrated in FIGURE 2 showing lockable gear 73 meshed with gear 75. Gear 75 is connected to differential 72 so that by changing the position of gear 73, an angular differential is established between shafts 70 and 74 leading to valves 62 and 68. Other differential systems obvious to persons skilled in the art may also be utilized to achieve an angular rotating displacement between shafts 74 and 70 and 82 and 78.

The application of pressurized liquid to line 50 changes the position of valve 32 from normal position 42 to vented position 41. Since valve 32 is spring loaded the normal position connecting inlet 38 to plugged outlet 42 will be maintained in the absence of the pressure in line 50.

The second branch 60 is connected through an initiator valve 76, of the rotatable type having a passage therethrough when properly aligned, to line 52 connected to air valve 34. The valve 76 is connected to shaft 78 through a gear differential 80 to a shaft 82 connected to a terminator valve 84. The valve 84 is positioned between line 52 and an oil sump and is driven by shaft 86 from gear box 88. In this manner, the rotatable valves 76 and 84 are rotated in synchronism with the crankshaft 27 and, by means of gear differential 80, a selected angular difference is maintained between the open positions of these two valves. The connections of the valves to shaft 27 and the purposes of the gear differentials will be more apparent from the following description of operation.

FIGURE 3 illustrates the operating sequence and relative timing of the valve action for the FIGURE 1 system.

For purposes of this description, the operating cycle of the energizing system is divided into two periods, the diastole and systole. The systolic interval is divided into a preliminary isometric phase and a subsequent isotonic phase. The valve geometry and timing is arranged so that the piston works against the pressure load of the artificial heart only for the brief interval of the isometric phase. During the isometric phase of systole, the piston compresses air into the pumping chamber of the artificial heart air chamber and its connecting conduit. During the subsequent isotonic phase, the trapped air expands to complete the systole.

Figure 3A:
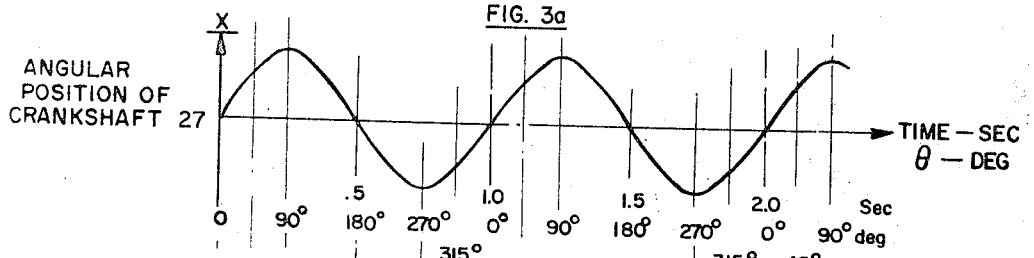
Figure 3B:
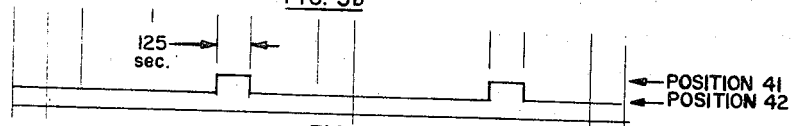
Figure 3C:
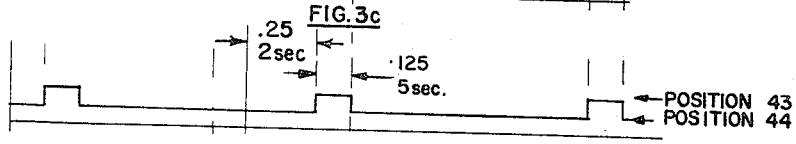

FIGURE 3a shows the approximately sinusoidal travel of piston 26, as represented by the angular position $\theta$ of crankshaft 27. FIGURES 3b, 3c and 3e–3h show respectively the positions of valves 32, 34, 62, 68, 76 and 84, and FIGURE 3d shows the pressure in the artificial heart ventricle 20, all as a function of time and of the corresponding orientation of piston 26.

At the start of the diastolic interval, (see FIGURES 3a and 3d, starting at $\theta=90°$) it is required that valve 32 be in position 42, i.e., unvented and that valve 34 is in position 44, i.e., connected to the artificial heart ventricle 20. During the interval from $\theta=90°$ to $\theta=270°$, piston 26 is moving from top-dead-center to bottom-dead-center, removing all excess air from ventricle 20 with the condition that the suction will not bring the air chamber pressure below the ambient atmospheric pressure by more than the pre-planned amount, say 10 mm. Hg, determined by the setting of suction release valve 36.

Figure 3D:
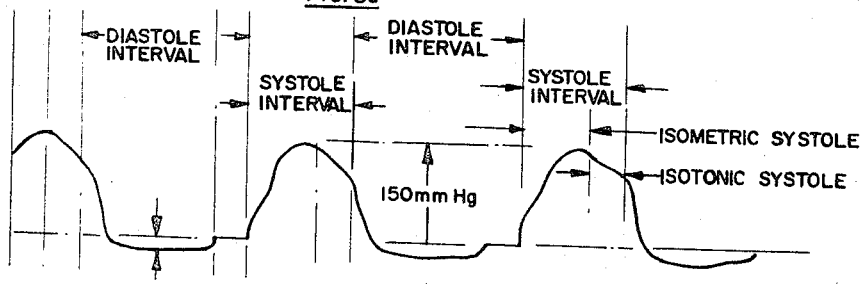
Figure 3E:
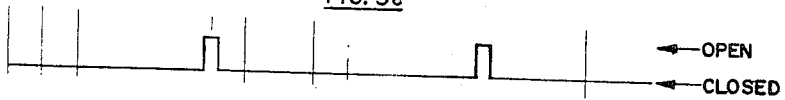
Figure 3F:
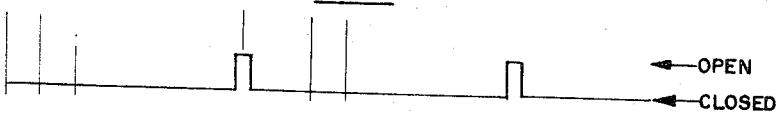
Figure 3G:
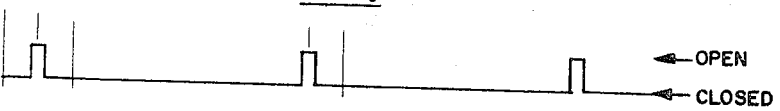
Figure 3H:
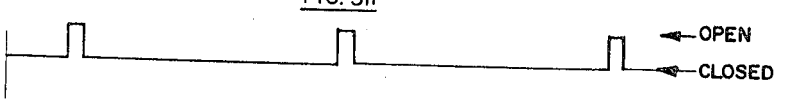

As shown in FIGURE 3d, heart chamber pressure drops from approximately 150 mm. Hg to $-10$ mm. Hg. When $\theta=270°$, valve 62 is momentarily opened and pressure is applied to valve 32 to connect inlet 38 to atmosphere vent 41. After valve 62 closes, valve 32 remains in this new position of joining port 38 to port 41, until released by the subsequent opening of valve 68. When valve 68 opens, valve 32 is de-energized and inlet 38 is again connected to plug 42. For purposes of illustration, it will be assumed that the dial settings of gear differentials 72 and 80 are selected to cause the piston to compress air into the ventricle chamber only during the 90-degree sector of crankshaft rotation centered about the mid-upstroke position. Thus, valve 32 is energized from $\theta=270°$ to $\theta=315°$. At $\theta=315$, the piston has already travelled through some of its upstroke cycle, i.e., from $\theta=270°$ to $\theta=315°$, with port 38 vented to atmosphere via port 41. At $\theta=315°$ valve 32 is unvented and line 30 is connected through valve 34 to heart ventricle 20. When valve 32 is connected to plugged outlet 42 a pressure surge is transmitted to the outlet 44 since the compression cycle has already started. The pressurized air is applied to the heart to accomplish pumping by the artificial heart during the isomertic systole, i.e., $\theta=315°$ to $\theta=45°$. The pressure buildup inside the artificial heart chamber, see FIGURE 3d, increases until approximately the end of the isometric systole, at which time valve 76 is opened. The slope of the pressure increase inside the heart chamber is strongly dependent upon the displacement volume of the air source. For example, if a piston is used with a displacement volume much greater than that required for the stroke volume of the heart, the slope will become more vertical in appearance. The control system permits only that quantity of air into the heart chamber as necessary to effect pumping. The opening of valve 76, valve 84 being closed, energizes valve 34 to disconnect the artificial heart from inlet 40 and vents inlet 40 through outlet 43. Until valve 84 opens, the artificial heart ventricle 20 is isolated from the energizing system 22 and the trapped air previously pumped into the heart chamber expands to continue the pumping. During the isotonic systole, the pressure inside the chamber may reduce somewhat as the heart contracts.

Some exemplary times are shown in FIGURE 3, for a heart rate of 60 beats per minute. The systolic interval may require approximately 0.375 second and the diastolic interval approximately 0.625 second. Valve 34 may be in position 43 for approximately 0.125 second and valve 32 in position 41 for approximately 0.125 second.

When valve 84 opens, the pressure in line 52 is reduced and valve 34 returns to its normal position connecting inlet 40 with heart connecting line 44. At this time $\theta=90°$, i.e., the top-dead-center positon of the piston 26 has been reached and the air withdrawal phase is initiated. During this diastolic interval the air pressure in the artificial heart chamber is withdrawn continuously until $\theta=270°$, at which time valve 62 opens to energize valve 32 and again vent the energizing system 22 through outlet 41. In this manner the entire energizing system is returned to atmospheric pressure at the same time during each cycle of operation of the energizing system 22. Thus, each operating cycle starts from the same reference pressure and no pressure buildup within the system is possible. Further, the adjustable suction release valve 36 prevents excessive reduction of pressure and is preferably adjusted to prevent the creation of a vacuum less than 10 mm. Hg below atmospheric pressure.

The systolic interval, during which the artificial heart ventricle is energized by system 22 to eject blood, may be adjusted so that the stroke of the artificial heart may be changed to meet the desired conditions. The duration of systole is determined by the time between the opening of valve 68, which releases the pressure on valve 32, and opening of valve 84, which releases the pressure on valve 34. This period of time may be varied through changes in lockable dial settings of the gear differentials 72 and 80 to adjust the relative timing of these two operations either with respect to $\theta$ or to each other. The gear boxes 66 and 88, and gear differentials 72 and 80, may take any of several standard design forms. For example, if valves 62, 68, 76 and 84 are simple stopcocks which produce an open configuration every 180° of rotation, each of the gear boxes 66 and 88 need only be a simple two to one reduction from the crankshaft 27.

A second embodiment system for gating an adjustable portion of the piston-expelled air is shown in FIGURES 4a and 4b, which replaces all of the apparatus in FIGURE 2.

Line 30 is connected from the piston to the heart chamber. Valves 46 and 48 are connected to the line between the piston and the heart chamber to control air flow into the chamber.

The valves in the particular embodiment shown are stopcock valves having flat portions (see FIGURE 4b), 11, 13, 15 and 17 made to prevent compressed air in line 30 from escaping to the atmosphere through openings 19 and 21 for approximately 90° of stopcock rotation. However, step-down gearing 21, 23 and 25 is provided so that the rotation of the piston crankshaft 27 is 360° for each 180° rotation of the valves.

When both valves 46 and 48 are closed, air is injected into the heart chamber. Whenever either valve 46 or 48 is open, piston 26 and the heart chamber 20 are both opened to the atmosphere. The air flow into the heart chamber is varied by advancing valve 46 and retarding valve 48 by means of gears 59, 61 and 67 and lockable dial shaft 69.

Referring to FIGURE 4a, it can be seen that as long as dial shaft 69 is locked, the bevel-gear differentials 55 and 57 and driveshaft gears 21, 23 and 25 will cause valves 46 and 48 to rotate at half the speed and in the opposite direction of the piston crankshaft 27. The particular parallel alignment of the valve passages 19 and 21 shown in FIGURE 4b corresponds to the mid-downstroke position of the piston, and to the shaft 69 setting which delivers the entire upsweep volume of the piston into the ventricle chamber.

Increasing rotation of lockable dial shaft 69 in either direction from the position giving the parallel port alignment shown in FIGURE 4b will result in correspondingly lesser proportions of the piston upsweep volume being compressed into the heart chamber during each systolic interval. In this manner, the stroke volume of the ventricle is governed by the setting of the lockable dial shaft 69, and the heartbeat rate is governed by the setting of the speed control of motor 12 (see FIGURE 1).

Other control systems including variation on the above may be used to control air flow. For example, diastolic suction with the embodiment described above can readily be provided by inserting simple check valves between line 30 and valves 46 and 48 in FIGURE 4b, and attaching suction release valve 36 to line 30.

Although the invention has been described and illustrated in detail, it is to be understood that the same is by way of illustration and example only, and is not to be taken by way of limitation; the spirit and scope of this invention being limited only by the terms of the appended claims.

I claim:
1. An artificial heart pump comprising pump means for pumping fluid, an artificial heart chamber, first valve means operable to allow said pumped fluid to pressurize said artificial heart chamber, said first valve means further operable to connect said pumped fluid to ambient pressure,
    second valve means operable to connect said pumped fluid to ambient pressure, means relatively synchronizing the operation of said valves, and means synchronizing the operation of said valves relative to the operation of said pump means.
2. An artificial heart pump comprising pump means for pumping fluid, an artificial heart chamber, means connecting said first means to said artificial heart chamber, first valve means connecting said fluid pumped by said pump means and said artificial heart chamber to ambient pressure,
    second valve means connecting said fluid pumped by said pump means and said artificial heart chamber to ambient pressure, means for synchronizing the operation of said valves with said pump means and means for adjusting said valves relative to each other.
3. An artificial heart pump comprising fluid supply means for injecting fluid into an artificial heart chamber during a first interval of time, said supply means including means for exhausting the fluid from said artificial chamber after expansion by the fluid in the chamber, said supply means further including means for venting the fluid to the ambient during a second interval of time, means synchronized with the supply means for varying said first and second intervals of time.
4. An artificial heart regulating system comprising means for supplying fluid over a repeating cycle into an artificial heart chamber including means permitting withdrawal of the fluid from the chamber,
    valve means having outlet positions for regulating the quantity of fluid injected into the chamber and for establishing an ambient pressure reference inside the chamber,
    means synchronized with the supply means for supply- ing fluid for controlling the outlet position of the valve means.

5. The system as recited in claim 4 wherein said valve means includes first valve means having at least a first outlet to the atmosphere and means for closing said outlet, and second valve means having at least a first outlet to the atmosphere and means for closing said outlet.

6. The system as recited in claim 5 wherein said control means comprises first means for switching the first valve from a closed position to an atmospheric outlet position and second means for switching the second valve from a closed position to an atmospheric outlet position, and said means synchronized with the means for supplying air includes means for initiating the switching of said first and second means from one position to another at the same time during each repeating cycle and means for changing the time in the cycle when the first and second valve means are switched from one position to another.

7. The system recited in claim 4 wherein said means permitting withdrawal includes means for withdrawing the fluid under pressure.

8. The system recited in claim 4 wherein said means for establishing an ambient pressure reference inside the chamber includes means for establishing the reference prior to supplying fluid to the chamber.

9. The system as recited in claim 4 wherein said fluid is air and said means for supplying air comprise a reciprocating piston in a cylinder for compressing the air prior to supplying the air to the chamber, said valve means including means for interrupting the flow of air to the chamber during said compression and means for permitting air flow into the chamber for an interval of time after the compression, said interval being symmetrically positioned about the mid-upstroke position of the piston inside said chamber, said ambient pressure reference being established after said interval of time and before said compression.

10. The system recited in claim 4 wherein said fluid is air and said means for supplying air comprise a reciprocating piston in a cylinder for compressing the air prior to supplying the air to the chamber, said valve means including means for interrupting the flow of air to the chamber during said compression and means for permitting air flow into the chamber for an interval of time after the compression, said interval being symmetrically positioned about the mid-upstroke position of the piston inside said cylinder, said ambient pressure reference being established after said interval of time and before said compression, and wherein said valve means includes two valves each having variable outlet positions for changing the quantity of air flowing into the chamber during said interval and for changing the time when the air is compressed.

11. The system recited in claim 4 wherein said fluid is air and said means for supplying air comprise a reciprocating piston in a cylinder for compressing the air prior to supplying the air to the chamber, said valve means including means for interrupting the flow of air to the chamber during said compression and means for permitting air flow into the chamber for an interval of time after the compression, said interval being symmetrically positioned about the mid-upstroke position of the piston inside said cylinder, said ambient pressure references being established after said interval of time and before said compression, and wherein said valve means includes two valves each having variable outlet positions for changing the quantity of air flowing into the chamber during said interval and for changing the time when the air is compressed, and further wherein the system comprises differential gearing means having shafts connected to said valves and an adjacent gear means mechanically connected to said differential gear means for varying the outlet position of one valve with respect to the other for varying the quantity of air supplied from approximately zero to essentially all of the piston displacement.

12. The system recited in claim 9 wherein said valve means comprise first and second valve means for regulating the quantity of air injected into the chamber and for establishing an atmospheric pressure reference inside the chamber, said first valve means including at least a first outlet to the atmosphere and a second outlet for supplying air to the artificial heart chamber, said second valve including a first outlet to the atmosphere and a second outlet for directing air to the artificial heart, said second outlet of the second valve is terminated, and wherein said control means further comprises third valve means for switching the first valve means for switching the first valve between the atmospheric and heart outlets, fourth valve means for switching the second valve between the atmospheric and terminated outlets, and said means synchronized with the means for supplying air includes means for initiating the switching of the third and fourth valve means at the same time during each repeating cycle including means for first switching the second valve from its atmospheric outlet to its terminated outlet during the isometric portion of the systolic interval and for switching the first valve means from its heart outlet during the isotonic portion of the systolic interval, and further includes means for switching the first valve means to the heart outlet at the end of the systolic interval and means for switching the second valve to its atmospheric position at an interval of time preceding the end of the diastolic interval for establishing an atmospheric pressure reference inside the heart chamber prior to beginning a systolic interval.

13. An artificial heart pump comprising air supply means for injecting air into an artificial heart chamber during a first variable interval of time, said air supply means including means for exhausting the air from said artificial chamber after maximum expansion by the air in the chamber, said air supply means further including means for venting air to the atmosphere during a second variable interval of time, switching means synchronized with the air supply means for varying said first and second intervals of time, said fluid is a gas and said system includes an artificial heart regulating system comprising means for supplying air over a repeating cycle into an artificial heart chamber including means permitting withdrawal of the air from the chamber.

valve means having outlet positions for regulating the quantity of air injected into the chamber and for establishing an atmospheric pressure reference inside the chamber, means synchronized with the means for supplying air for controlling the outlet position of the valve means.

14. An artificial heart pump comprising piston means for pumping into and venting a volume of air from an artificial heart chamber at variable intervals over a repeating cycle, first valve means comprising an atmosphere outlet position and an artificial heart chamber outlet position, said valve means being connected to said piston means for directing the flow at least a portion of said air alternately to the atmosphere and the heart chamber, second valve means comprising an atmosphere outlet position and an outlet position for directing the flow of at least a portion of said air, said second valve means being connected to said piston means for directing at least a portion of said air alternately to the atmosphere and to the heart chamber, first control valve means synchronized with said piston means for switching said first valve from the one outlet position to another during the pumping and venting cycle of said piston, including means for returning said first valve means to its original outlet an interval of time following the switching, second control valve means synchronized with said piston means and said first control valve means for switching said second valve from one outlet position to another during the pumping and venting cycle of said piston, including gear means for returning said second valve means to its original position an interval of time following the switching, said first and second control valve means being synchronized with said piston means whereby said first and second valves are switched at variable intervals for supplying a predetermined volume of air to an artificial heart-chamber for pumping blood through an artificial heart and for withdrawing the air from the chamber.

References Cited

UNITED STATES PATENTS

| | | | |
|---|---|---|---|
| 2,690,174 | 9/1954 | Fuchs | 128—44 |
| 3,053,249 | 9/1962 | Smith | 128—64 |
| 3,099,260 | 7/1963 | Birtwell | 128—1 |
| 3,182,335 | 5/1965 | Bolie | 128—1 XR |
| 3,233,607 | 2/1966 | Bolie | 128—64 |
| 3,266,487 | 8/1966 | Watkins et al. | 128—1 |
| 3,337,878 | 8/1967 | Bolie | 128—1 XR |

DALTON L. TRULUCK, *Primary Examiner.*

MARTIN F. MAJESTIC, *Assistant Examiner.*